UNITED STATES PATENT OFFICE.

CHARLES LEWIS PORTER, OF ST. LOUIS, MISSOURI, ASSIGNOR TO THE CHICAGO GLYCERINE COMPANY.

PROCESS OF REFINING GLYCERINE.

SPECIFICATION forming part of Letters Patent No. 345,174, dated July 6, 1886.

Application filed February 4, 1886. Serial No. 190,842. (Specimens.)

*To all whom it may concern:*

Be it known that I, CHARLES LEWIS PORTER, of the city of St. Louis, in the State of Missouri, have invented a certain new and useful Improvement in Processes for Refining Glycerine, of which the following is a full, clear, and exact description.

The process consists in mixing with the glycerine aluminum in any form, either the pure metal in a pulverized or granulated state, or any compounds containing the metal. The aluminum or aluminous material is used in the decoloration and purification of crude or distilled glycerine.

In carrying out the process I generally use pure clay, which is mixed intimately with the glycerine, and the mixture allowed to settle. Oxide of aluminum, (alumina,) silicate of aluminum, or clays, earths, salts, rocks, or metallic alloys containing aluminum or extracts from the same, may be used.

I am aware that it is not new, broadly considered, to employ alumina as a purifying agent for petroleum and other oils. This, therefore, I do not claim.

I claim as my invention—

The process of decolorizing and purifying glycerine which consists in treating it with aluminum, substantially as set forth.

CHARLES LEWIS PORTER.

In presence of—
SAML. KNIGHT,
BENJN. A. KNIGHT.